Dec. 8, 1953   C. L. VAN WEIJNSBERGEN   2,662,190
ELECTRICAL RECTIFYING SYSTEM
Filed March 23, 1951
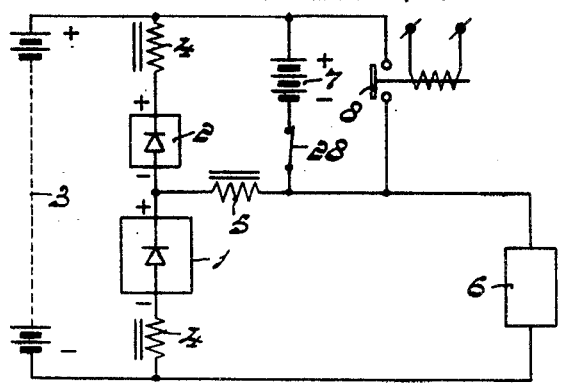
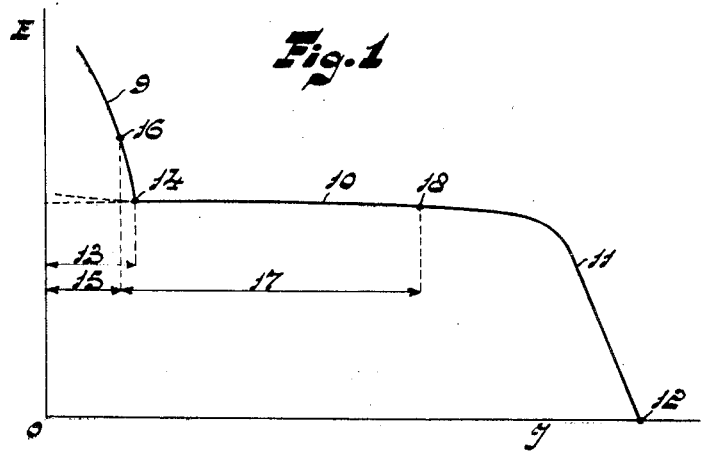
Fig.1
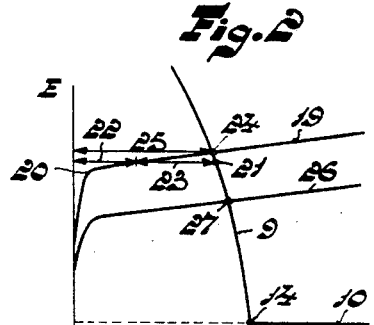
Fig.2
Fig.3
INVENTOR
CHARLES LOUIS VAN WEIJNSBERGEN
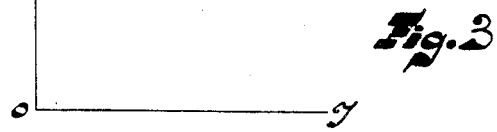
BY
AGENT Patented Dec. 8, 1953

2,662,190

UNITED STATES PATENT OFFICE 2,662,190

ELECTRICAL RECTIFYING SYSTEM

Charles Louis van Weijnsbergen, Hilversum, Netherlands, assignor to Hartford National Bank and Trust Company, Hartford, Conn., as trustee Application March 23, 1951, Serial No. 217,227

Claims priority, application Netherlands April 5, 1950

4 Claims. (Cl. 307—66)

The invention relates to an electrical rectifying system for deriving from an alternating-current mains a direct-current for supplying a load.

An electrical rectifying system is known which comprises a main rectifier and an auxiliary rectifier connected in series therewith in the same sense for charging a storage battery, which in case of emergency supplies current to a load, for example a telephone exchange or the like, which is normally supplied from the rectifying system. In this system, the main rectifier has a voltage-current characteristic curve which varies slightly in voltage with varying load currents and which falls with higher load currents, the auxiliary rectifier having a falling characteristic curve even for low load currents. In such a combination, the resultant voltage-current characteristic curve has, at low loads, a portion showing a decline in voltage, which portion is produced by the auxiliary rectifier for charging the battery to a maximum voltage, for example, a conserving voltage. The characteristic curve further exhibits at higher loads a portion varying little in voltage, for example, for the correct operation of the voltage-sensitive telephone relays and, at still higher loads, a portion dropping in voltage, whereby in addition a current and voltage restriction may be obtained at very high load currents.

In this known system the load, for example, the telephone exchange, is connected in parallel with the battery so that the latter is only charged to a voltage exceeding the conserving voltage when the total consumption is located in the restricted current range with higher total voltage of the auxiliary rectifier.

According to the present invention, however, in such a system the load is not connected directly in parallel with the battery but with the main rectifier, while the parallel combination of at least one counter-storage cell and a switch for short-circuiting this cell is connected in parallel with the auxiliary rectifier.

The use of a counter-cell to reduce an excessive battery voltage is known per se. It is also known to short-circuit this cell manually by means of a switch, when the battery voltage has dropped to the desired load voltage.

In the rectifying system according to the invention the combination of the assembly has the particular advantage that it enables the battery to be charged, even at a higher total current strength, which lies outside the range of the auxiliary rectifier, to a voltage exceeding the slightly varying voltage.

It is furthermore possible automatically to restrict the charging voltage, even at a comparatively high charging current strength, to a maximum value desired for the battery. In this case it is essential for the invention that the no-load voltage of the auxiliary rectifier should exceed the nominal voltage of the counter-cell or cells during the passage of current and that the characteristic curves of the auxiliary rectifier and the counter-cell or cells should intersect at a point which substantially corresponds to the desired battery voltage.

In general the auxiliary rectifier has a materially lower voltage than the main rectifier.

In order that the invention may be readily carried into effect, an example will be described in detail with reference to the accompanying drawings, in which:

Fig. 1 shows the circuit-arrangement in accordance with the invention and

Figs. 2 and 3 show the characteristic curves of this circuit-arrangement.

Referring to Fig. 1, the main rectifier 1 is connected in series in the same sense with the auxiliary rectifier 2 for charging a storage battery 3, which supplies current in case of emergency. Such an emergency occurs, for example, when the mains supply for the rectifiers breaks down.

The reference numerals 4 and 5 designate filter chokes. The load 6 is connected to the main rectifier 1 and the parallel combination of three counter-cells 7 and a short-circuit switch 8 is connected in parallel with the auxiliary rectifier 2.

Such a series combination of rectifiers has for the battery and the load jointly a voltage-current characteristic curve, which is shown in Fig. 2. This characteristic curve has, in a range of low load current strength, a portion 9 of declining voltage, at an increasing load current strength, a portion of slightly varying voltage 10 and, at a still higher load current strength a portion 11 again declining in voltage, which, in certain cases, is even capable of providing a maximum current restriction at 12; at this point the voltage becomes substantially zero.

If the load is connected in the aforesaid known manner in parallel with the battery, it depends on the current consumption of this load, whether the working point will be caused to lie on the portion 10 (the normal current range) or on the portion 9 (at lower current included within the current range 13 of the auxiliary rectifier). As long as the total load current exceeds the value designated 13, the battery can be charged only to the voltage of the portion 10 (conserving voltage). A charge to a higher voltage, as is frequently desired for a battery, is only possible in periods of low total load, lower than the current 13. In this case the voltage may increase along the portion 9 of the characteristic curve accordingly as the current decreases. In periods of normal consumption the battery can therefore never be charged to a voltage exceeding the conserving voltage.

Furthermore, at a gradually decreasing load current, the battery voltage will gradually increase according to portion 9 of the characteristic curve and this is frequently objectionable.

In the circuit-arrangement shown in Fig. 1, in which the load 6 is connected directly to the main rectifier, the last-mentioned difficulties are obviated. This will be explained with reference to a numerical example.

Assume the A.-C. mains supply for the rectifiers to have broken down, so that the battery 3 has, for some time provided the supply of the load 6. Assume in addition the load 6 to require normally a voltage of 60 volts and the battery voltage to have dropped to 60 volts during the emergency operation. Now the mains voltage for the rectifiers is restored so that the main rectifier 1 and the auxiliary rectifier 2 again become operative. The main rectifier 1 normally furnishes the operation voltage, i. e. 60 volts and the auxiliary rectifier furnishes a no-load voltage of, for example, 10 volts, which voltage may drop to 0 volts, as the current passing through the auxiliary rectifier increases. Since the voltage of the main rectifier itself is 60 volts and also the battery voltage is 60 volts the first moment upon restoration of the mains supply, the sum of the voltages of the main rectifier and of the auxiliary rectifier will also be 60 volts that is to say that the current supplying to the battery from the auxiliary rectifier must be equal to the value designated 13, since only in this case will the voltage across the auxiliary rectifier at the working point 14 be zero and the aforesaid condition be fulfilled. However, under the action of this charging current, the battery voltage soon increases, so that the current strength across the auxiliary rectifier drops, for example, to the value designated 15, associated with the working point 16 of a voltage of, for example, 1.5 volts. The current strength supplied from the main rectifier may be designated, say, 17 and this current strength is associated with the working point 18 of about 60 volts.

In accordance with the battery voltage increases, the working point 16 will shift more and more upwards along the branch 9, the charging current strength decreasing.

For further explanation of the function of the counter-cells 7 connected in parallel with the auxiliary rectifier 2, Fig. 3 shows the branches 9 and 10 of the voltage-current characteristic curve on an exaggerated scale. The curve 19 designates the characteristic curve of the three counter-cells. This means that, as long as the battery voltage remains below the curve 19, the counter-cells do not absorb any appreciable current. However, when the battery voltage rises above the "knee" 20 to the point 21 of the branch 9, the current supplied from the auxiliary rectifier may be represented by the sum of the curves 22 and 23, the first of which designates the current passing through the counter-cells 7 and the latter designating the charging current passing through the battery 3. If the working point rises still higher, theoretically up to point 24, the entire current 25 is absorbed by the counter-cells and the battery 3 is consequently not charged any further than to the voltage of point 24.

If two counter-cells are used the characteristic curve becomes as is designated by 26 and the battery is consequently charged to the lower voltage associated with the working point 27.

If the mains voltage breaks down again, the battery has charged, for example, to 66 volts assuming the working point 24 of Fig. 3 to exceed by 6 volts the branch 10 having a voltage of about 60 volts. Since, upon absorption of current the battery voltage rapidly drops down to the load of 60 volts, the counter-cells 7 can be short-circuited by closure of the relay 8. A plurality of relays may be used instead of one relay 8 to short-circuit in succession one, two and all the three counter-cells, so that the voltage is adapted more gradually.

When the battery voltage drops down, the relays may be caused to become operative automatically, in known manner, in accordance with the desired voltage. If a switch 28 is used in the counter-cell conductor, the battery can be charged to a voltage exceeding that of point 24 in Fig. 3 by opening the switch.

What I claim is:

1. A system for converting an alternating-current supply to a direct-current to supply a load, said system comprising a main rectifier having an output voltage-current characteristic curve which under low and normal load current conditions varies only slightly in voltage and which under relatively heavy load current conditions declines in voltage, an auxiliary rectifier having an output voltage-current characteristic curve which even under low load current conditions declines in voltage, an emergency storage battery for supplying said load upon failure of said alternating-current supply, means connecting said main and auxiliary rectifiers in series across said battery to apply the combined voltages thereof to charge said battery, means to apply the output voltage of said main rectifier to said load, at least one counter cell connected across said auxiliary rectifier to limit the charge of said battery to a desired voltage, and a switch connected across said cell for short circuiting same.

2. A system, as set forth in claim 1, further including a second switch interposed between said counter cell and said auxiliary rectifier to permit charging of said battery above said desired voltage.

3. A system, as set forth in claim 1, wherein said auxiliary rectifier produces an output voltage in a no load condition which exceeds the nominal voltage of said counter cell during the passage of current therethrough, the characteristic voltage-current curves of said auxiliary rectifier and said cell intersecting at a point corresponding to the desired battery voltage.

4. A system, as set forth in claim 1, further including means responsive to the voltage across said battery to actuate said switch to short circuit said cell when said voltage falls below a predetermined value.

CHARLES LOUIS van WEIJNSBERGEN.

References Cited in the file of this patent

UNITED STATES PATENTS

| Number | Name | Date |
| --- | --- | --- |
| Re. 19,848 | Beetem | Feb. 11, 1936 |
| 1,756,589 | Gilson | Apr. 30, 1930 |